US012431661B2

(12) United States Patent
Kopelos et al.

(10) Patent No.: US 12,431,661 B2
(45) Date of Patent: Sep. 30, 2025

(54) ELECTRICAL CONNECTOR WITH TERMINAL MODULES AND FRAME HAVING MODULE BAYS FOR CUSTOMIZABLE INPUT/OUTPUT CONFIGURATION

(71) Applicant: Aptiv Technologies AG, Schaffhausen (CH)

(72) Inventors: Justin Kopelos, Niles, OH (US); Daniel Vernon, Youngstown, OH (US); Abhaya Kishore, Nagercoil (IN); Sivakumar Jogula, Achampet (IN)

(73) Assignee: APTIV TECHNOLOGIES AG, Schaffhausen (CH)

( * ) Notice: Subject to any disclaimer, the term of this patent is extended or adjusted under 35 U.S.C. 154(b) by 388 days.

(21) Appl. No.: 18/103,521

(22) Filed: Jan. 31, 2023

(65) Prior Publication Data

US 2023/0246379 A1 Aug. 3, 2023

Related U.S. Application Data

(60) Provisional application No. 63/335,911, filed on Apr. 28, 2022, provisional application No. 63/305,839, filed on Feb. 2, 2022.

(51) Int. Cl.
*H01R 13/518* (2006.01)
*H01R 13/514* (2006.01)

(52) U.S. Cl.
CPC ......... *H01R 13/518* (2013.01); *H01R 13/514* (2013.01)

(58) Field of Classification Search
CPC ............... H01R 13/518; H01R 13/514; H01R 13/4361; H01R 13/4362
USPC .............................. 439/639, 752, 540.1, 716
See application file for complete search history.

(56) References Cited

U.S. PATENT DOCUMENTS

| | | | | |
|---|---|---|---|---|
| 7,029,335 | B2 * | 4/2006 | Osada | H01R 24/542 439/468 |
| 7,278,890 | B1 * | 10/2007 | Smutny | H01R 13/4361 439/752 |
| 11,183,790 | B2 * | 11/2021 | Puckel | H01R 13/506 |
| 2003/0194914 | A1 * | 10/2003 | Duck | G02B 6/3817 439/701 |

(Continued)

FOREIGN PATENT DOCUMENTS

| | | | |
|---|---|---|---|
| EP | 3719935 | A1 | 10/2020 |
| WO | 2007062683 | A1 | 6/2007 |

OTHER PUBLICATIONS

"Partial European Search Report Received mailed on Jun. 19, 2023", 14 Pages.

*Primary Examiner* — Gary F Paumen
(74) *Attorney, Agent, or Firm* — Billion & Armitage

(57) ABSTRACT

A terminal module includes a housing defining a cavity configured to receive an electrical terminal within and a primary terminal lock configured to releasably retain the electrical terminal after it is fully inserted within the cavity. The terminal module further includes a secondary terminal lock attached to the housing defining a protrusion that enters into the cavity at a location rearward of the electrical terminal as the secondary terminal lock is moved from a pre-stage position to a staged position. A method of assembling an electrical connector including this terminal module is also provided.

18 Claims, 15 Drawing Sheets

(56) References Cited

U.S. PATENT DOCUMENTS

| | | | | |
|---|---|---|---|---|
| 2007/0155252 | A1* | 7/2007 | Ferderer | H01R 13/506 439/680 |
| 2015/0280351 | A1* | 10/2015 | Bertsch | H01R 13/518 439/586 |
| 2016/0093980 | A1* | 3/2016 | Beischer | H01R 13/6315 439/345 |
| 2018/0358735 | A1* | 12/2018 | Herron | H01R 13/518 |
| 2020/0059034 | A1* | 2/2020 | Tiemann | H01R 13/6273 |
| 2020/0295500 | A1* | 9/2020 | Tiemann | H01R 13/518 |
| 2021/0175668 | A1* | 6/2021 | Milligan | G02B 6/4293 |
| 2021/0265766 | A1* | 8/2021 | Kliever | H01R 13/514 |
| 2022/0029346 | A1* | 1/2022 | Tiemann | H01R 13/514 |

* cited by examiner

ELECTRICAL CONNECTOR WITH TERMINAL MODULES AND FRAME HAVING MODULE BAYS FOR CUSTOMIZABLE INPUT/OUTPUT CONFIGURATION

CROSS-REFERENCE TO RELATED APPLICATION

This application claims benefit of claims priority to U.S. Provisional Application No. 63/335,911 filed on Apr. 28, 2022, and U.S. Provisional Application No. 63/305,839 filed on Feb. 2, 2022, the entire disclosure of each of which is hereby incorporated by reference.

TECHNICAL FIELD

This disclosure is directed to an electrical connector with terminal modules and a frame having module bays for customizable input/output configuration.

BACKGROUND

Traditional electrical connection system designs include a molded connector body containing one to more than one hundred terminal cavities. The terminal cavities within a such a traditional molded connector body are not relocatable and are fixed in position and the type of terminal they may accept. A hard change to the tools used to fabricate the connector body, e.g., molds, is required in order to modify the input/output terminal configuration for different applications.

SUMMARY

According to one or more aspects of the present disclosure, an electrical connector assembly includes a frame having a plurality of module bays and a plurality of terminal modules. Each terminal module has a housing and an electrical terminal disposed within a cavity in the housing. Each terminal module is configured to be received within any one of the plurality of module bays.

In one or more embodiments of the electrical connector assembly according to the previous paragraph, one terminal module in the plurality of terminal modules has a different electrical terminal configuration than another terminal module in the plurality of terminal modules.

In one or more embodiments of the electrical connector assembly according to any one of the previous paragraphs, one terminal module in the plurality of terminal modules has an identical electrical terminal configuration as every other terminal module in the plurality of terminal modules.

In one or more embodiments of the electrical connector assembly according to any one of the previous paragraphs, the plurality of terminal modules is removably attached to the frame within the plurality of module bays.

In one or more embodiments of the electrical connector assembly according to any one of the previous paragraphs, each module bay includes a pair of cantilevered locking arms arranged opposite one another, wherein a free end each locking arm defines a hook received with an indentation defined on a side of the housing, thereby securing each terminal module in the plurality of module bays.

In one or more embodiments of the electrical connector assembly according to any one of the previous paragraphs, each terminal module defines a pair of stop pads projecting from the housing configured to align the hook of each locking arm with the indentation in the side of the housing.

In one or more embodiments of the electrical connector assembly according to any one of the previous paragraphs, the pair of stop pads engage fixed ends of the pair of cantilevered locking arms.

In one or more embodiments of the electrical connector assembly according to any one of the previous paragraphs, each module bay includes four locking arms, and each housing defines four indentations and four stop pads.

In one or more embodiments of the electrical connector assembly according to any one of the previous paragraphs, the electrical connector assembly further includes a wire dress cover attached to the frame defining a plurality of posts configured to contact the plurality of terminal modules.

In one or more embodiments of the electrical connector assembly according to any one of the previous paragraphs, the plurality of posts is configured to push the plurality of terminal modules into engagement with the pair of cantilevered locking arms in each module bay.

According to one or more aspects of the present disclosure, a method of assembling an electrical connector includes the step of inserting a plurality of terminal modules into a frame having a plurality of module bays. Each of the terminal modules has a housing and an electrical terminal disposed within a cavity in the housing. Each terminal module is configured to be received within any one of the plurality of module bays.

In one or more embodiments of the method according to the previous paragraph, the method further includes the step of selecting and inserting one terminal module from the plurality of terminal modules that has a different electrical terminal configuration than another terminal module in the plurality of terminal modules inserted into the frame.

In one or more embodiments of the method according to any one of the previous paragraphs, the method further includes the step of selecting and inserting one terminal module from the plurality of terminal modules having an identical electrical terminal configuration as every other terminal module in the plurality of terminal modules inserted into the frame.

In one or more embodiments of the method according to any one of the previous paragraphs, each module bay includes a pair of cantilevered locking arms arranged opposite one another, each locking arm having a hook on a free end of each locking arm. A side of each terminal module defines an indentation. The method further includes the step of receiving the hook of each locking arm within the indentation, thereby securing each terminal module in each module bay of the frame.

In one or more embodiments of the method according to any one of the previous paragraphs, each terminal module defines a pair of stop pads projecting from the housing. The method further includes the step of placing the pair of stop pads in contact with the frame, thereby aligning the hook of each locking arm with the indentation in the side of the housing.

In one or more embodiments of the method according to any one of the previous paragraphs, the method further includes the step of engaging the pair of stop pads with fixed ends of the pair of cantilevered locking arms.

In one or more embodiments of the method according to any one of the previous paragraphs, each module bay includes four locking arms, and each housing defines four indentations and four stop pads.

In one or more embodiments of the method according to any one of the previous paragraphs, the method further includes the steps of attaching a wire dress cover defining a plurality of posts to the frame and placing the plurality of posts in contact with the plurality of terminal modules.

In one or more embodiments of the method according to any one of the previous paragraphs, the method further includes the step of pushing the plurality of terminal modules into engagement with the pair of cantilevered locking arms in each module bay using the plurality of posts.

In one or more embodiments of the method according to any one of the previous paragraphs, the method further includes the step of removing one terminal module in the plurality of terminal modules from one module bay in the plurality of module bays.

According to one or more aspects of the present disclosure, an terminal module includes a housing defining a cavity configured to receive an electrical terminal within and a primary terminal lock configured to releasably retain the electrical terminal after it is fully inserted within the cavity and a secondary terminal lock attached to the housing defining a protrusion that enters into the cavity at a location rearward of the electrical terminal as the secondary terminal lock is moved from a pre-stage position to a staged position.

In one or more embodiments of the terminal module according to the previous paragraph, the secondary terminal lock is moved from the pre-stage position to the staged position along a first axis that is generally parallel to a second axis that is parallel to an insertion direction of the electrical terminal into the cavity.

In one or more embodiments of the terminal module according to any one of the previous paragraphs, the terminal module is configured to be received within a module bay in a frame.

In one or more embodiments of the terminal module according to any one of the previous paragraphs, the terminal module is removably attached to the frame.

In one or more embodiments of the terminal module according to any one of the previous paragraphs, the module bay includes a pair of cantilevered locking arms arranged opposite one another. A free end each locking arm defines a hook received with an indentation defined on a side of the housing, thereby securing each terminal module in the module bay.

In one or more embodiments of the terminal module according to any one of the previous paragraphs, the terminal module defines a pair of stop pads projecting from the housing configured to align the hook of each locking arm with the indentation in the side of the housing.

In one or more embodiments of the terminal module according to any one of the previous paragraphs, the pair of stop pads engage fixed ends of the pair of cantilevered locking arms.

In one or more embodiments of the terminal module according to any one of the previous paragraphs, the module bay includes four locking arms, and the housing defines four indentations and four stop pads.

BRIEF DESCRIPTION OF THE DRAWINGS

The present invention will now be described by way of example with reference to the accompanying drawings, in which.

DETAILED DESCRIPTION

Non-limiting examples of electrical connector assemblies with terminal modules and a frame having module bays for customizable input/output configuration is described herein and is illustrated in FIGS. 1 through 9 and FIGS. 11 through 16.

This electrical connector assembly addresses the problem of reconfiguring the input and output terminals of the electrical connector assembly by proving multiple terminal modules having different terminal types. The terminal modules have a mounting interface that is accepted by any one of the module bays in the frame. This allows mixing and matching of the terminal modules to provide the desired input/output electrical and mechanical interface of the electrical connector assembly. The terminal type can vary between each module.

Many vehicle electrical interfaces require packaging terminals that are configured for transmitting digital data. There are multiple data terminal technologies that may be used, and vehicle applications often require packaging more than one type of data terminal. It may be desirable during a design cycle of the vehicle life to change the data terminal type to take advantage of different vendors or new terminal technologies. This electrical connector assembly allows the terminal types to be changed by switching one terminal module for another rather than retooling the connector body as was previously required. These terminal modules may alternatively or additionally include terminals for power and/or signal circuitry and may be used to change to different power and/or signal terminal types. This electrical connector assembly eliminates the need to fix the terminal types used during the design phase of a vehicle and maintain that same terminal configuration throughout the life cycle of the vehicle. Instead, the terminal modules and frame of this electrical connector assembly allow the terminal types to be easily changed without changing connector tooling and/or repackaging a different connector in the vehicle. This also allows easier customization of the electrical connector assembly to accommodate varying electrical device content in the vehicle due to different vehicle trim levels. It also allows design changes to more easily be made during the vehicle development phase.

Figure 1:
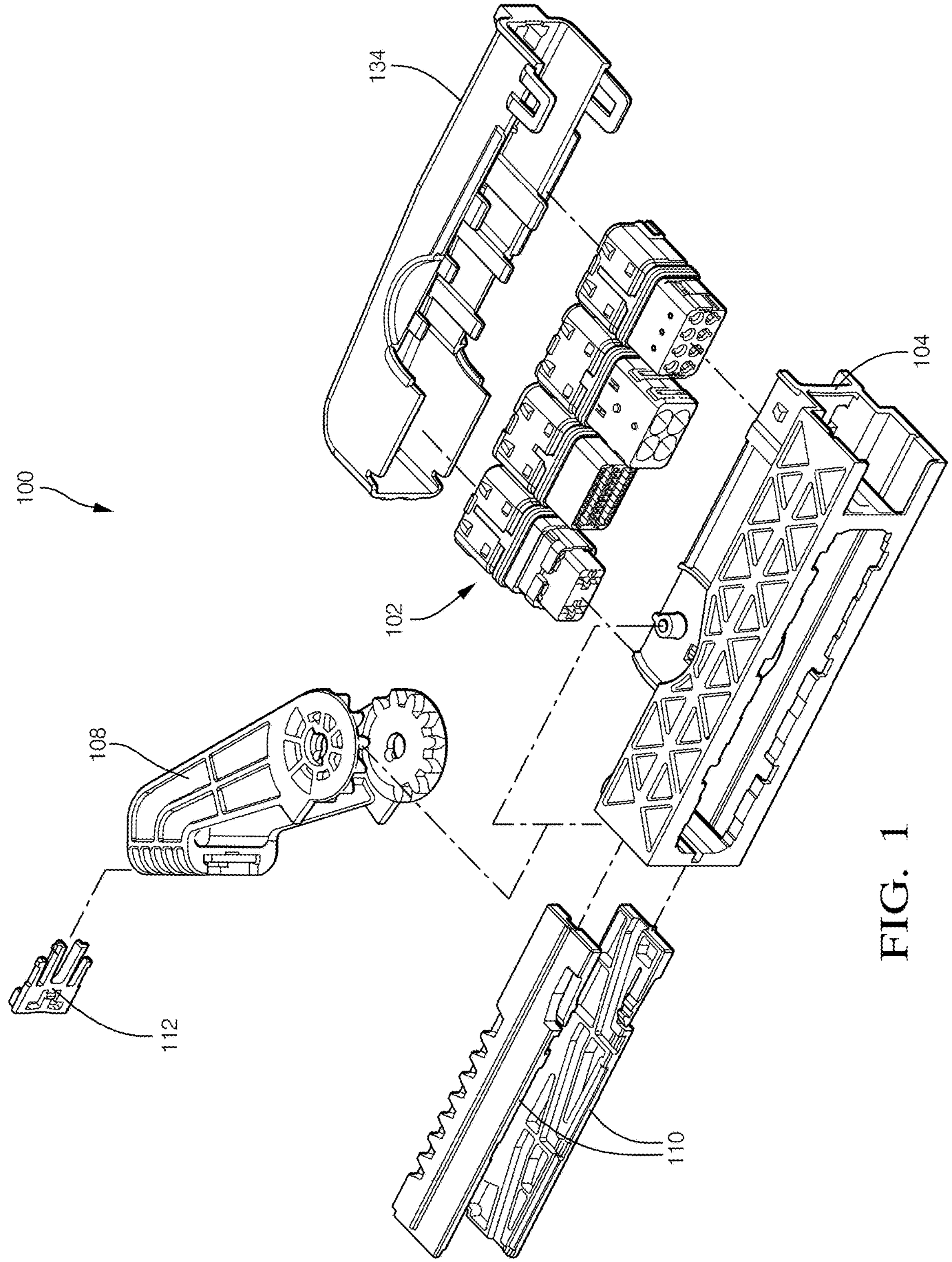
FIG. 1 illustrates an exploded view of an electrical connector assembly with terminal modules and a frame having module bays for customizable input/output configuration according to some embodiments.
Figure 2:
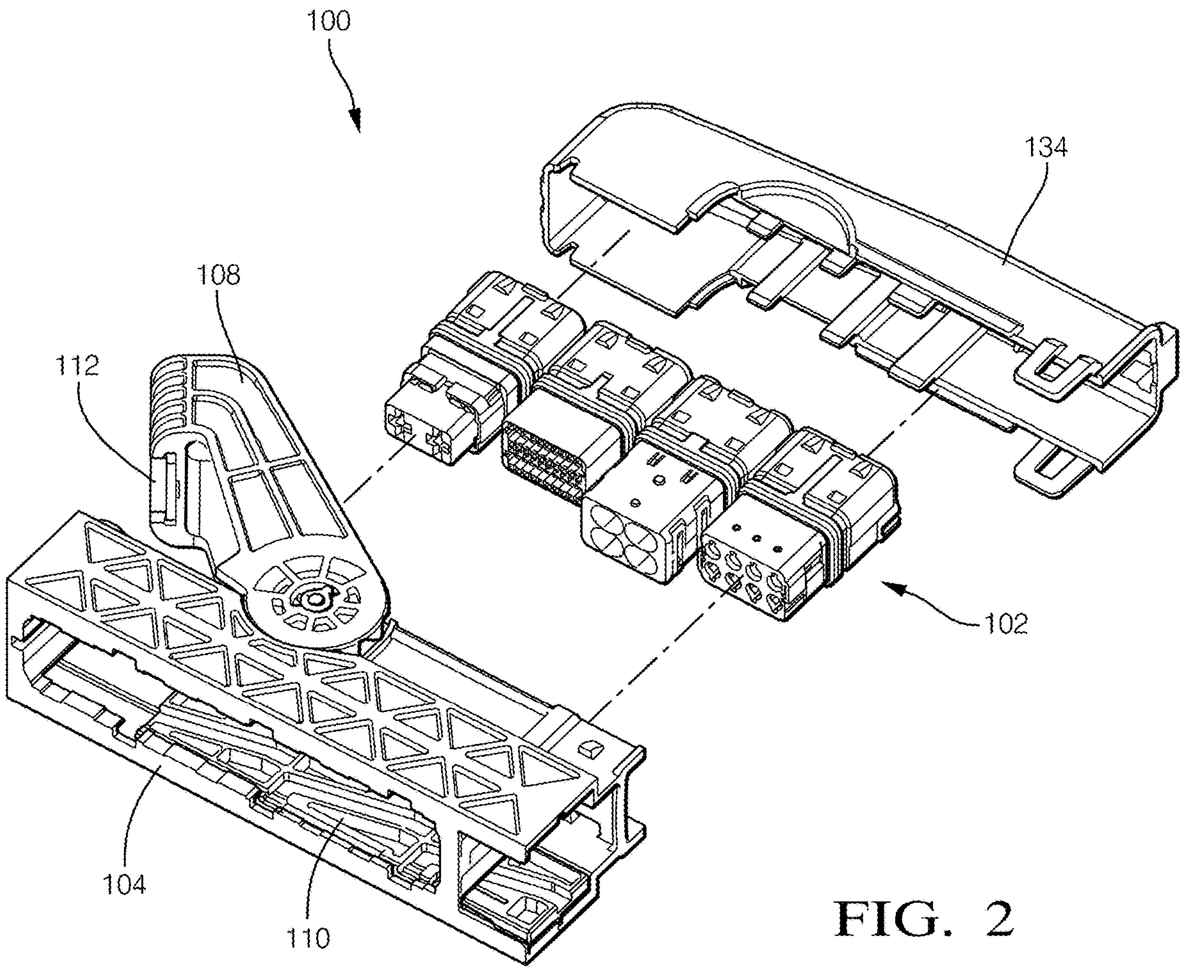
FIG. 2 illustrates a partially assembled view of the electrical connector assembly of FIG. 1 according to some embodiments.
Figure 3:
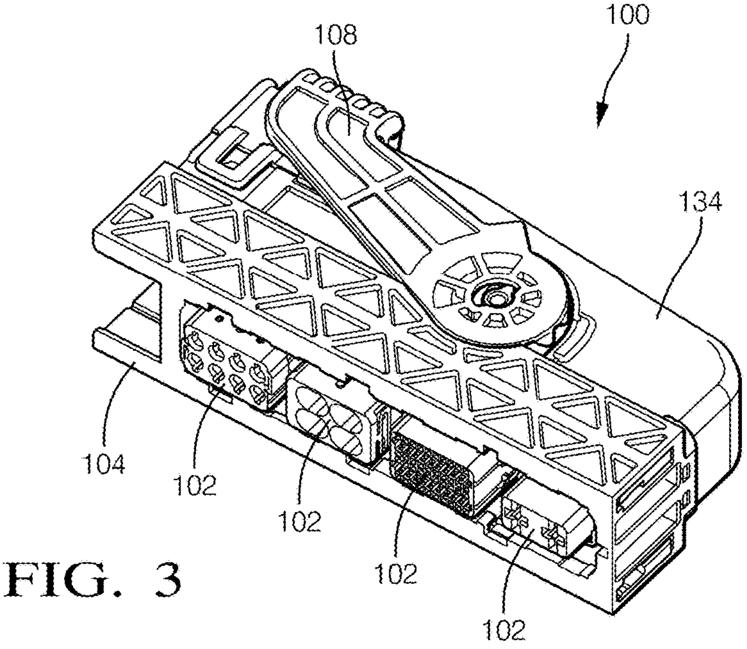
FIG. 3 illustrates a fully assembled view of the electrical connector assembly of FIG. 1 according to some embodiments.
Figure 10:
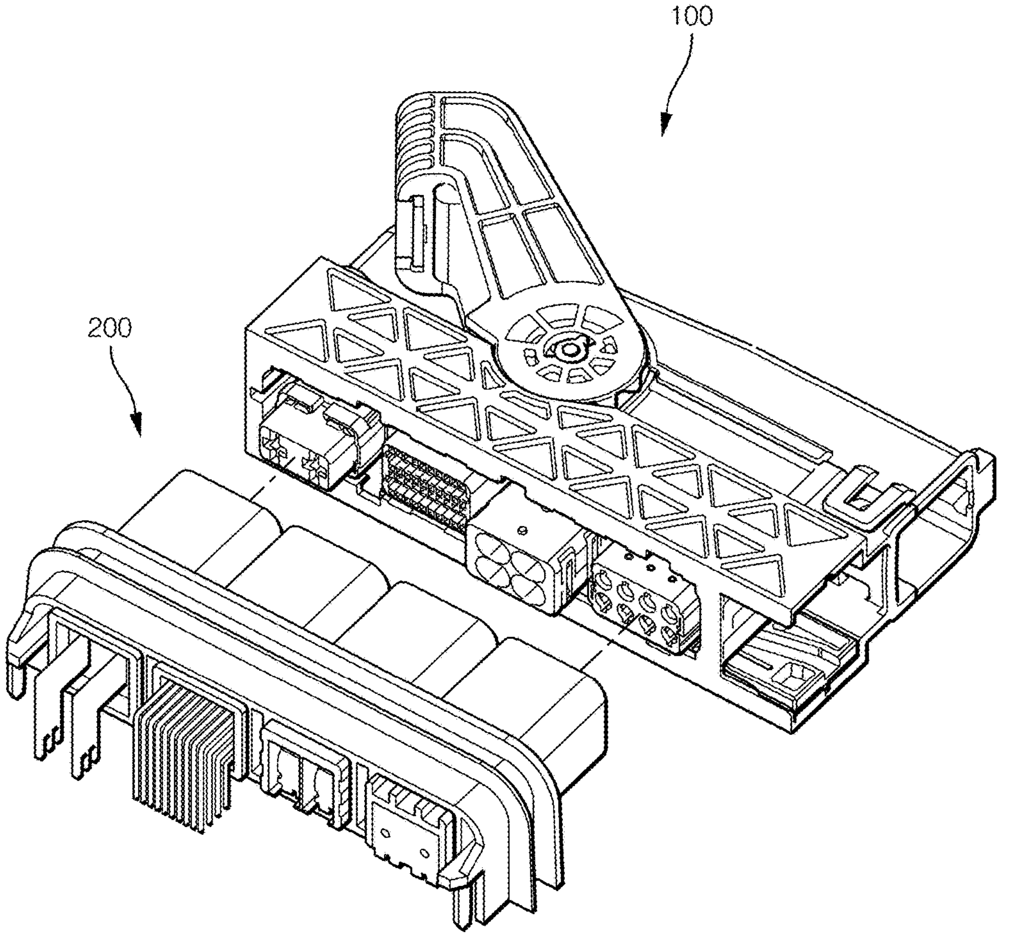
FIG. 10 illustrates a perspective view of the electrical connector assembly of FIG. 1 and a corresponding mating electrical connector assembly according to some embodiments.

FIGS. 1 through 3 illustrates an electrical connector assembly 100 with a plurality of terminal modules 102 and a frame 104 having a plurality of module bays 106 for customizable input/output configuration. The electrical connector assembly 100 also includes a mating assist lever 108 and mating assist sliders 110 that may be used to meet ergonomic requirements for mating force to mate the electrical connector assembly 100 with a corresponding electrical connector assembly 200 (see FIG. 10). The electrical connector assembly 100 further includes a connector position assistance device 112 to keep the mating assist lever in a locked position and inhibit inadvertent decoupling of the electrical connector assembly 100 and the corresponding electrical connector assembly 200.

Figure 4A:
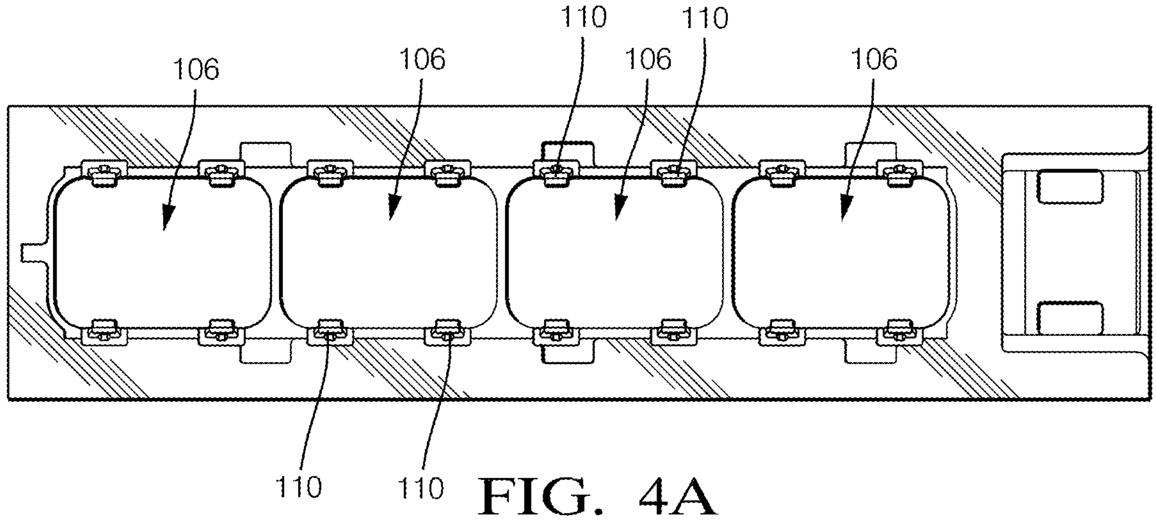
FIGS. 4A and 4B illustrate front and rear views of a frame for the electrical connector assembly of FIG. 1 according to some embodiments.
Figure 4B:
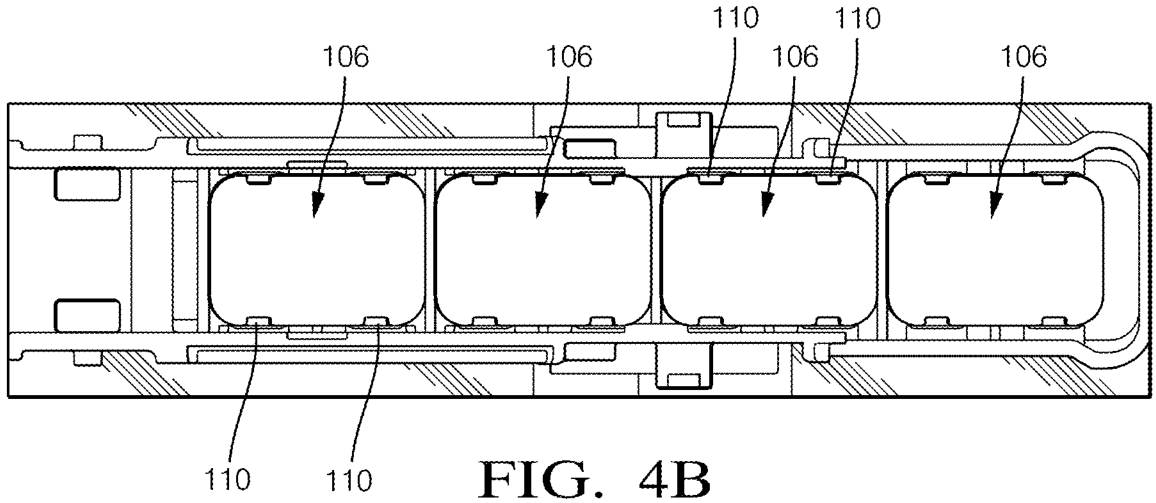

As shown in FIGS. 4A and 4B, the frame 104 defines several module bays 106 that are configured to receive terminal modules 102. Each module bay 106 has a common mechanical interface with the terminal modules 102 that includes a mechanism to secure each terminal module 102 within a module bay 106.

Figure 5:
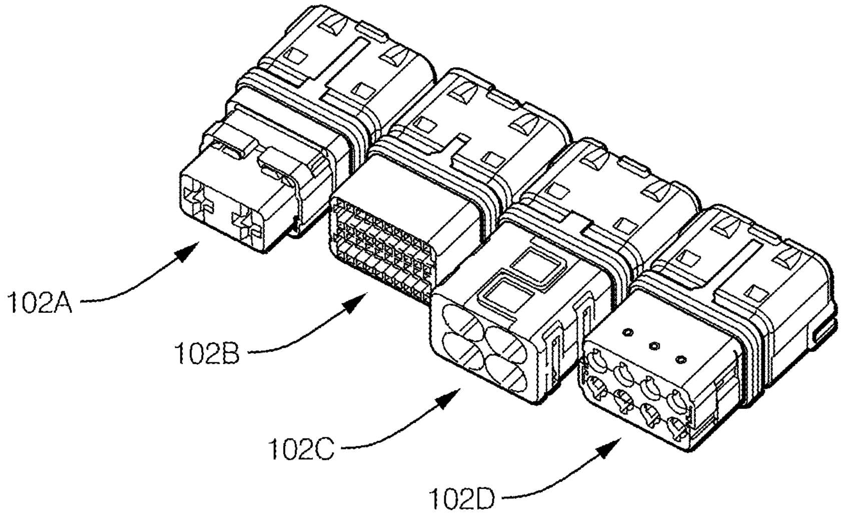
FIG. 5 illustrates a perspective view of four different terminal modules that may be used with the frame of the electrical connector assembly of FIG. 1 according to some embodiments.

FIG. 5 shows a number of examples of terminal modules 102A, 102B, 102C, 102D each containing a different terminal type, e.g., pin socket, blade socket, coaxial, or twin axial. In alternative embodiments, terminal modules may be envisioned that have include a mix of two or more different terminal types.

Figure 6:
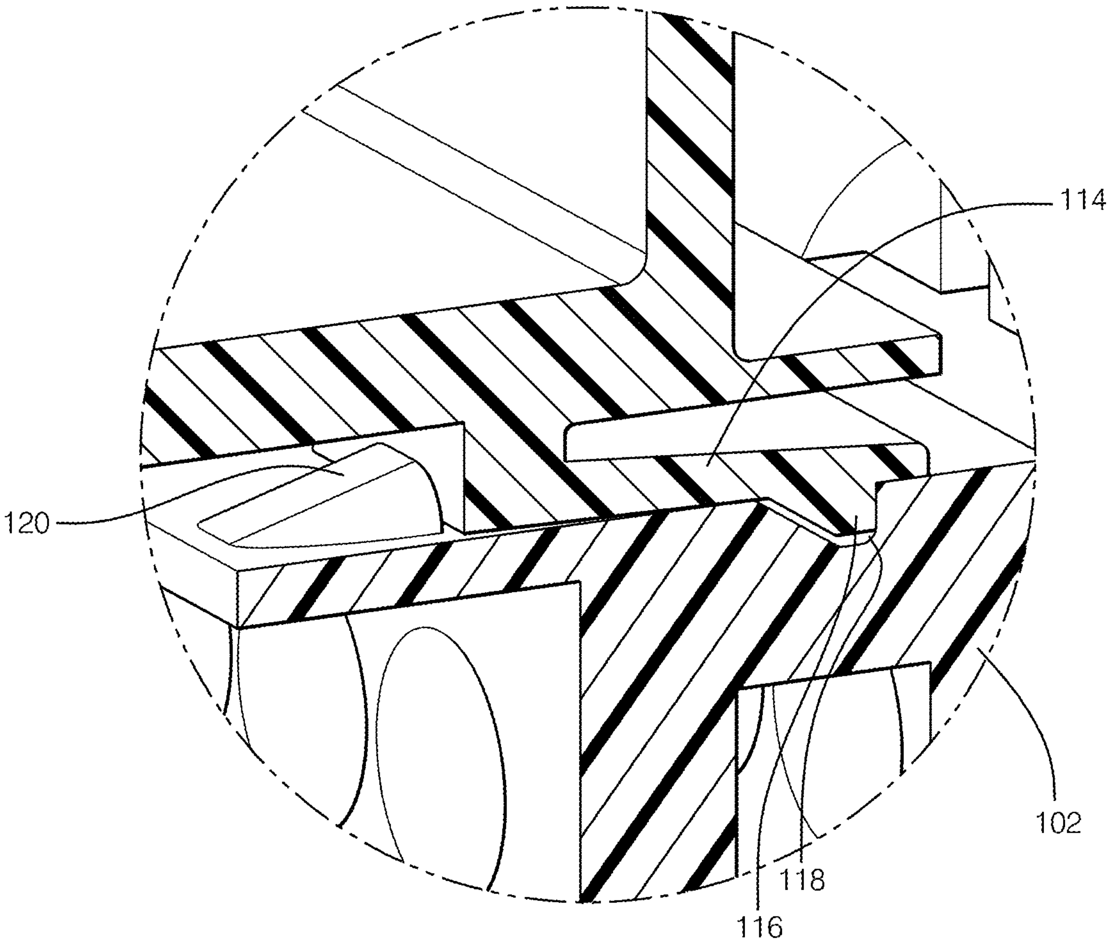
FIG. 6 illustrates a cross-section view of locks and stops of the electrical connector assembly of FIG. 1 according to some embodiments.

FIG. 6 shows the locking mechanism configured to secure the terminal modules 102 within the module bays 106 of the frame 104. Each module bay 106 has plurality of cantilevered locking arms 114 that have hooks 116 defined near the free ends of the locking arms 114. The hooks 116 are received in indentations 118 in the side walls of the terminal modules 102. The terminal modules also define a plurality of stop pads 120 that are configured to contact the fixed end of the locking arms 114. The locking arms 114, indentations 118, and stop pads 120 cooperate to secure the terminal modules 102 within the module bays 106 and maintain the desired location of the terminal modules 102 in the module bays 106.

Figure 7:
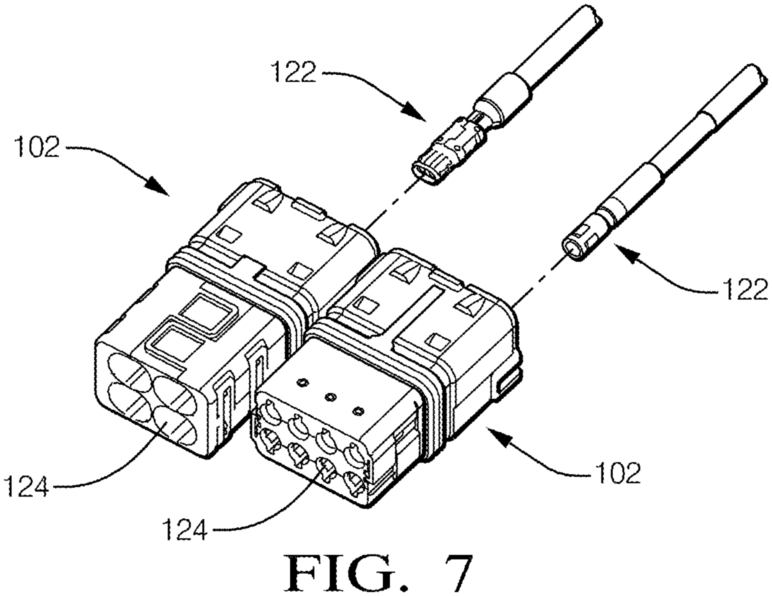
FIGS. 7 to 9 illustrates an assembly sequence of inserting cable and terminal assemblies into the terminal modules (FIG. 7), inserting the terminal modules into the frame (FIG. 8), and assembling a lever and dress cover to the frame (FIG. 9) according to some embodiments.
Figure 8:
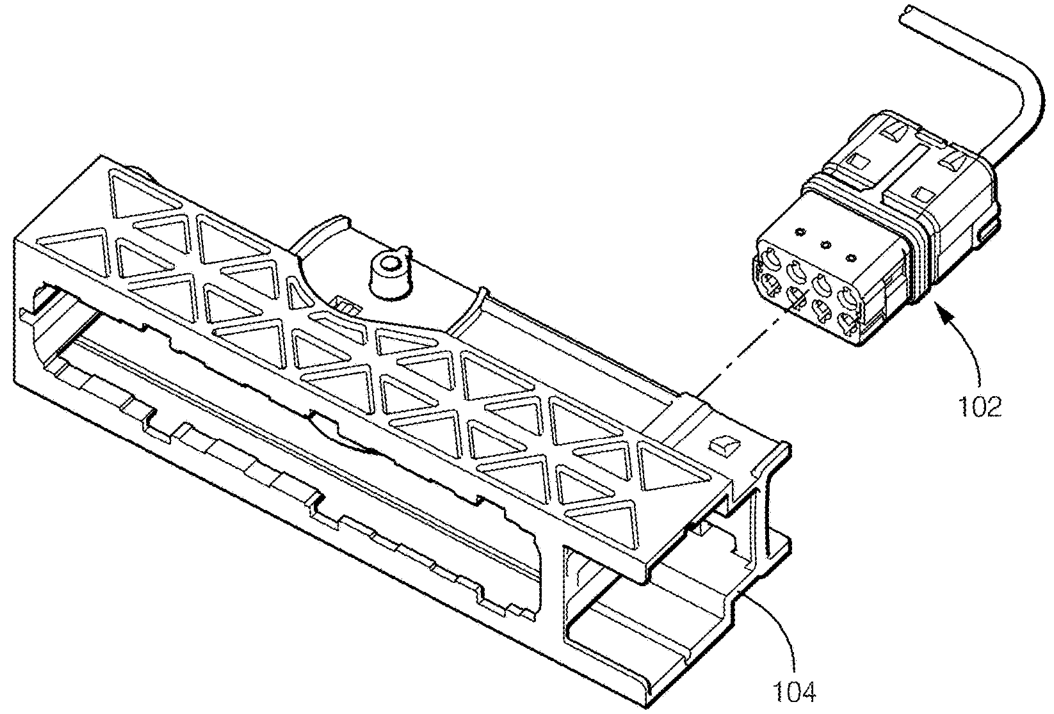
Figure 9:
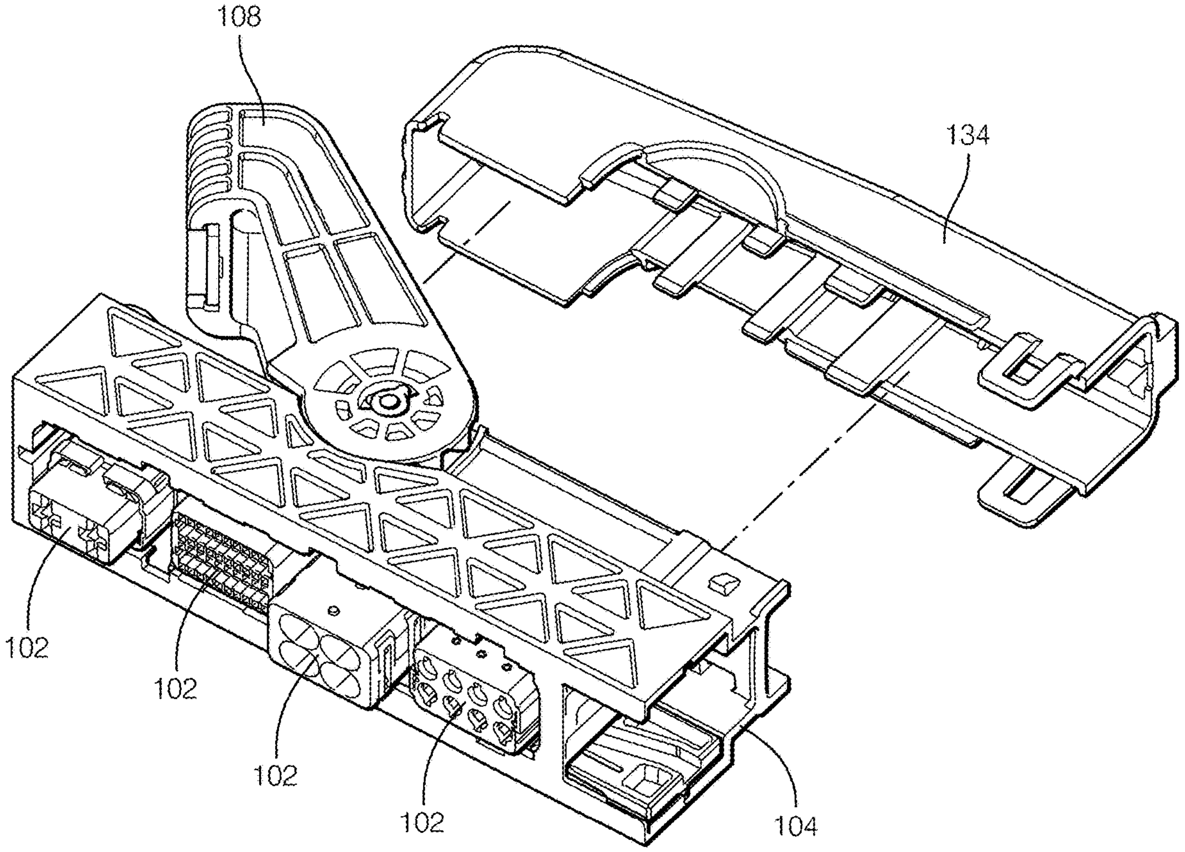
Figure 24A:
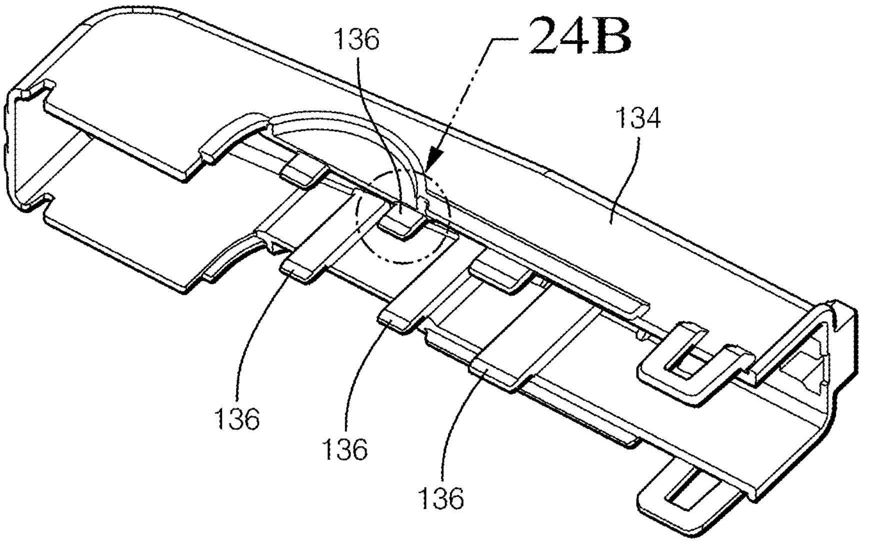
FIG. 24A illustrates a perspective view of a dress cover of the electrical connector assembly of FIG. 1 according to some embodiments.
Figure 24B:
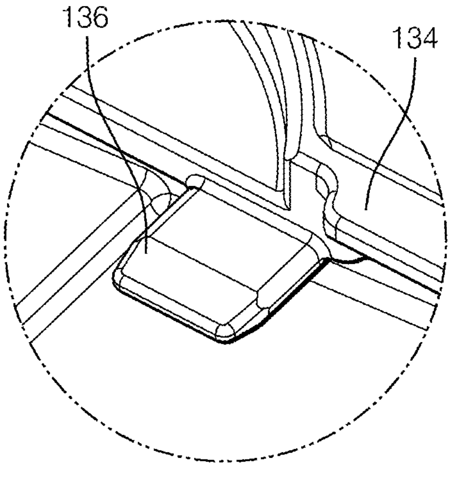
FIG. 24B illustrates a close-up view of tabs extending from the dress cover of FIG. 24A according to some embodiments.

FIGS. 7-9 illustrates a non-limiting example of a sequence of assembling the electrical connector assembly 100. As shown in FIG. 7 cable and terminal assemblies are inserted into the terminal modules 102. As shown in FIG. 8, the terminal modules are then insert into the module bays 106 in the frame 104. After the terminal modules are inserted within the frame, the mating assist lever, mating assist sliders, and wire dress cover are attached to the frame as shown in FIGS. 9, 24A, and 24B.

A non-limiting example of the corresponding electrical connector assembly 200 for the electrical connector assembly 100 is illustrated in FIGS. 10 through 16.

Figure 11:
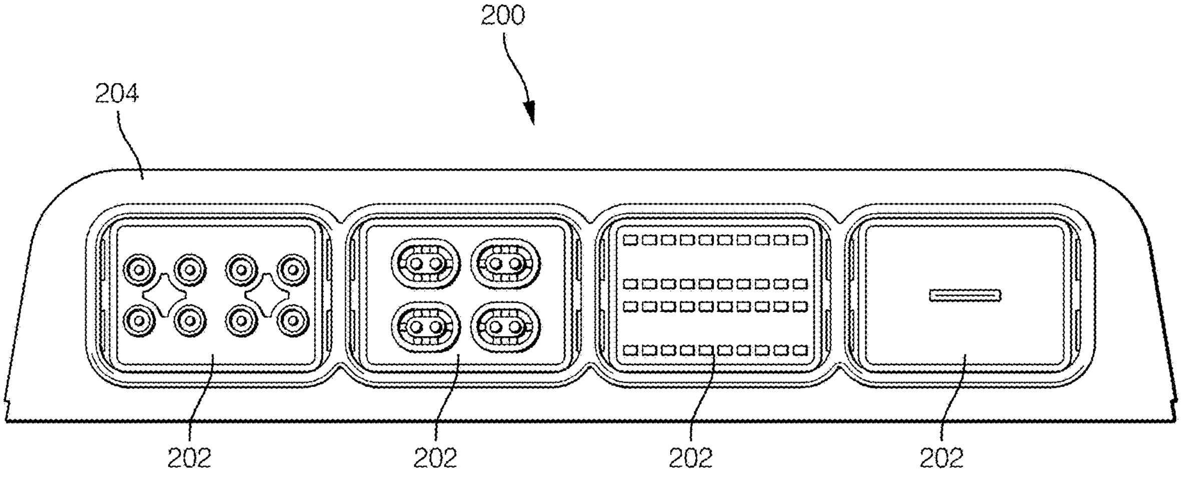
FIG. 11 illustrates a front view of the corresponding mating electrical connector assembly of FIG. 10 according to some embodiments.
Figure 12:
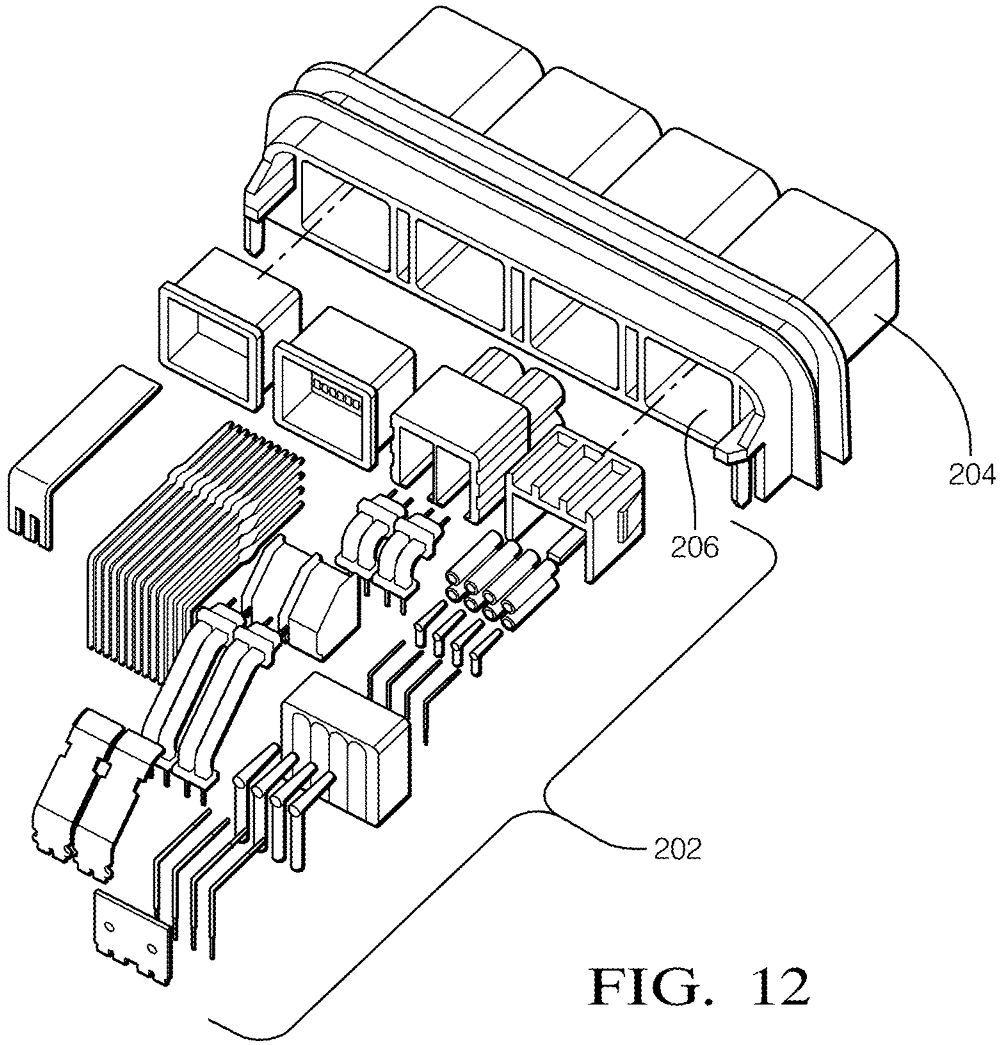
FIG. 12 illustrates an exploded view of corresponding mating electrical connector assembly of FIG. 10 according to some embodiments.

FIGS. 11 and 12 illustrate the corresponding electrical connector assembly 200 which similarly has plurality of terminal modules 202 and a frame 204 having a plurality of module bays 206 for customizable input/output configuration. The corresponding electrical connector assembly 200 also includes studs which mate with the mating assist slider.

As shown in FIGS. 12, the frame 204 defines several module bays 206 that are configured to receive terminal modules 202. Each module bay 206 has a common mechanical interface with terminal module 202 that includes a locking mechanism to secure each terminal module 202 within a module bay 206.

Figure 13:
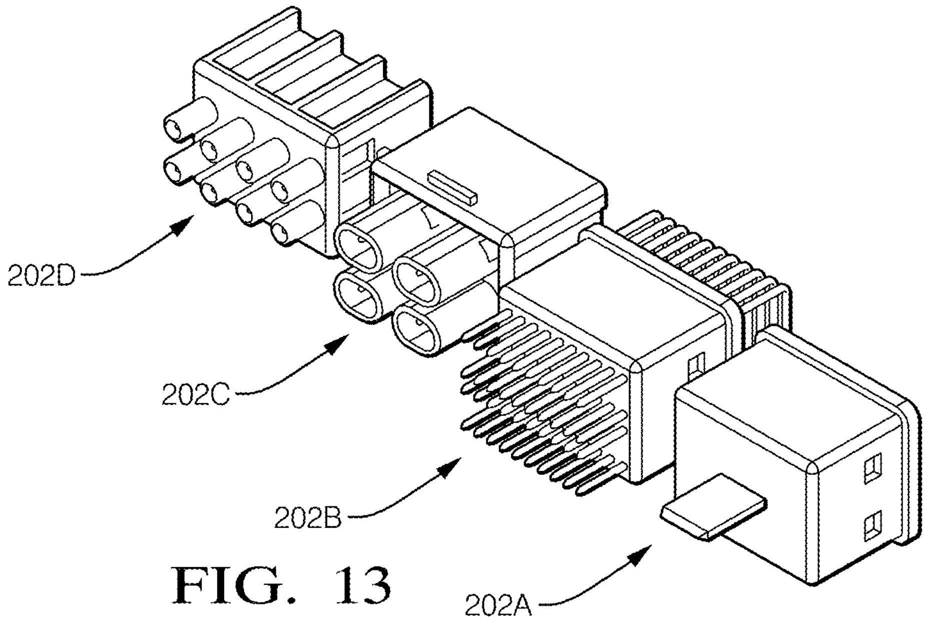
FIG. 13 illustrates a perspective view of four different terminal modules that may be used with the frame of the corresponding mating electrical connector assembly of FIG. 10 according to some embodiments.
Figure 14:
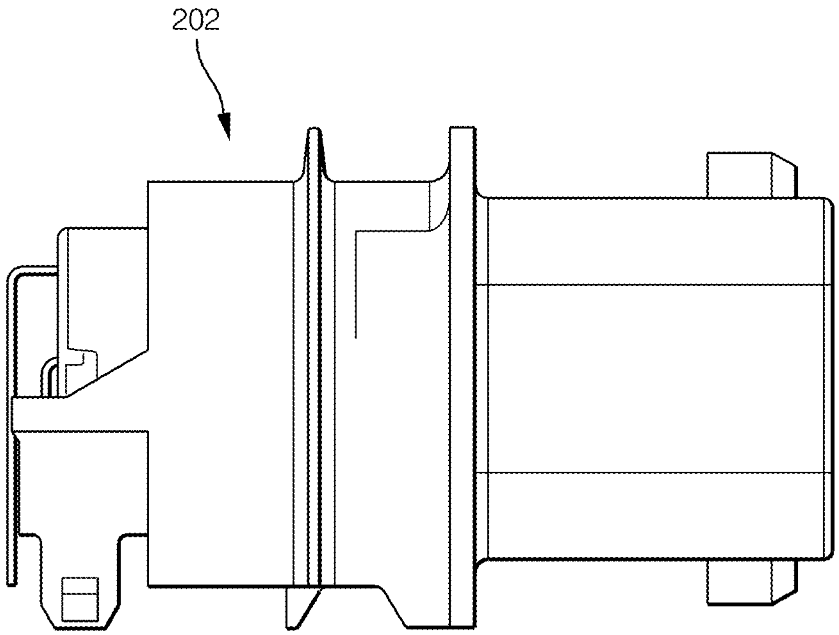
FIG. 14 illustrates a side view of one of the terminal modules of the corresponding mating electrical connector assembly of FIG. 10 according to some embodiments.
Figure 15:
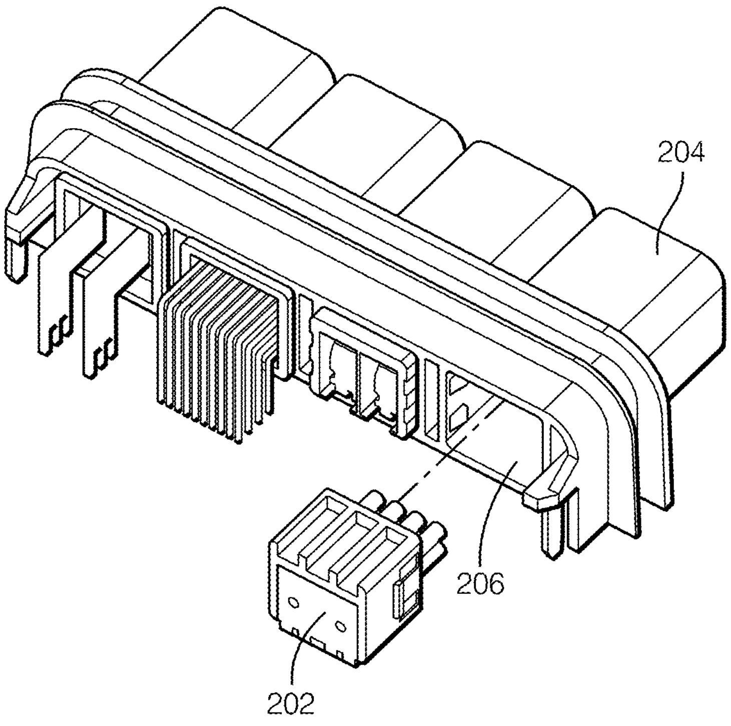
FIG. 15 illustrates a rear perspective view of the corresponding mating electrical connector assembly of FIG. 10 according to some embodiments.

FIG. 13 shows a number of examples of terminal modules 202A, 202B, 202C, 202D each containing a different terminal type, e.g., pin, blade, coaxial, or twin axial. In alternative embodiments, terminal modules may be envisioned that have include a mix of two or more different terminal types.

Figure 16:
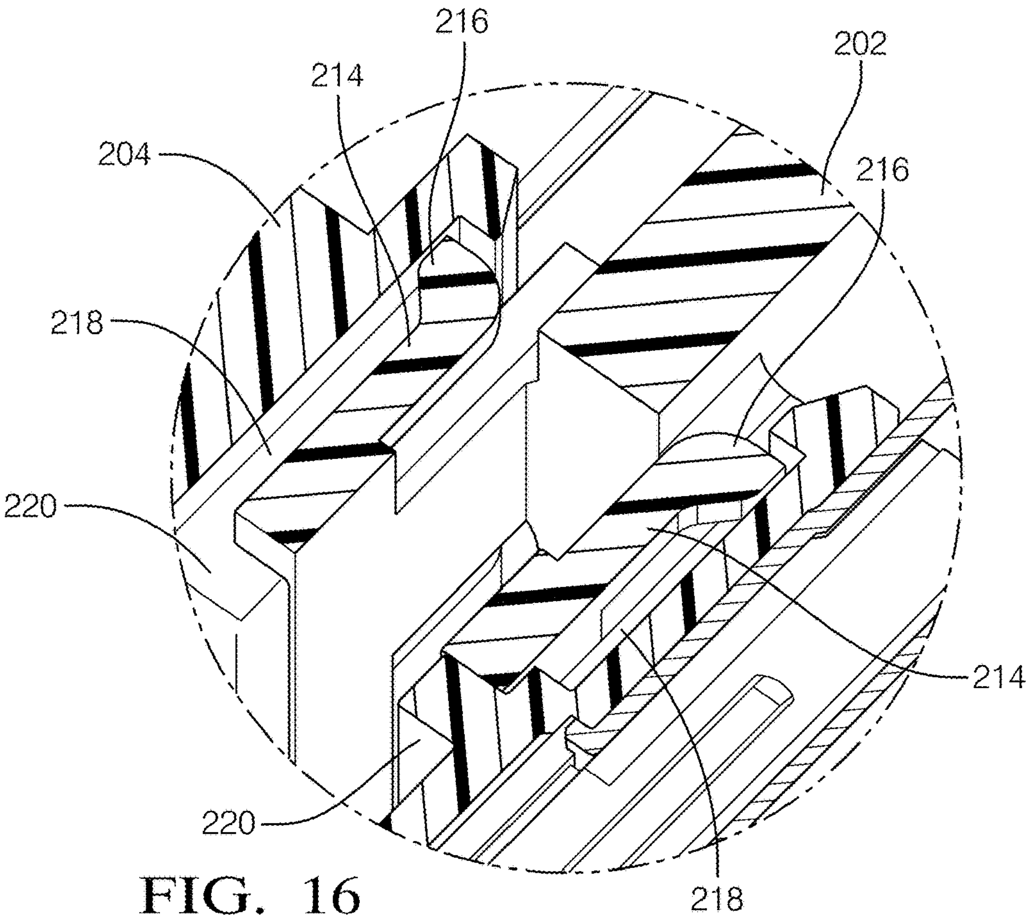
FIG. 16 illustrates a cross-section view of locks and stops of the corresponding mating electrical connector assembly of FIG. 10 according to some embodiments.
Figure 17:
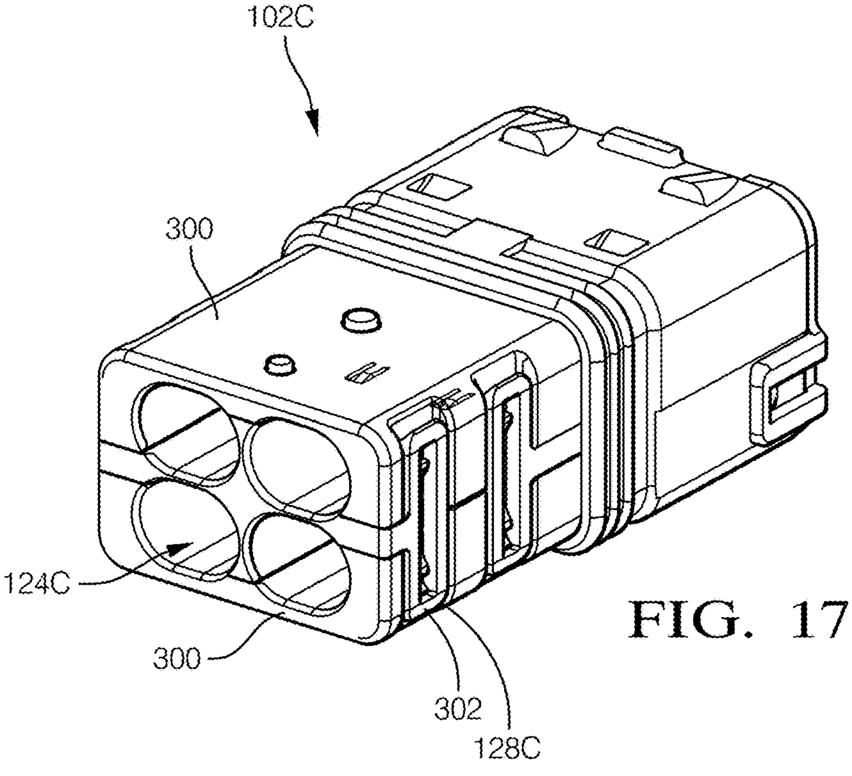
FIG. 17 illustrates a perspective view of a terminal module configured to contain twin axial cables and terminals assemblies according to some embodiments.
Figure 18A:
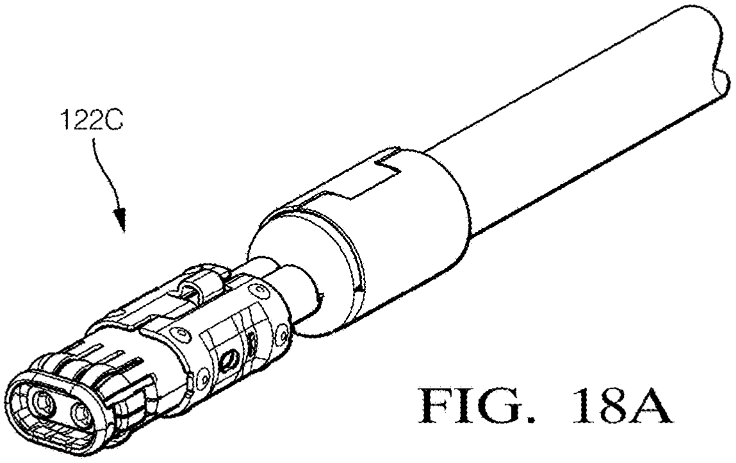
FIG. 18A illustrates a perspective view of a twin axial cable and terminal assembly according to some embodiments.
Figure 18B:
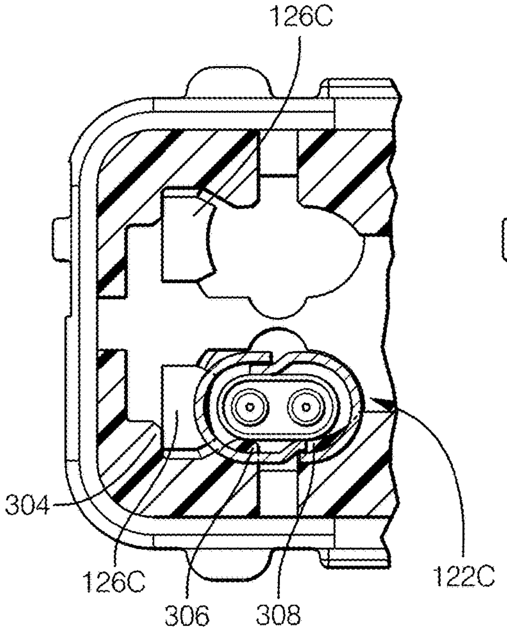
FIG. 18B illustrates a lateral cross section view of the terminal module of FIG. 20 according to some embodiments.
Figure 18C:
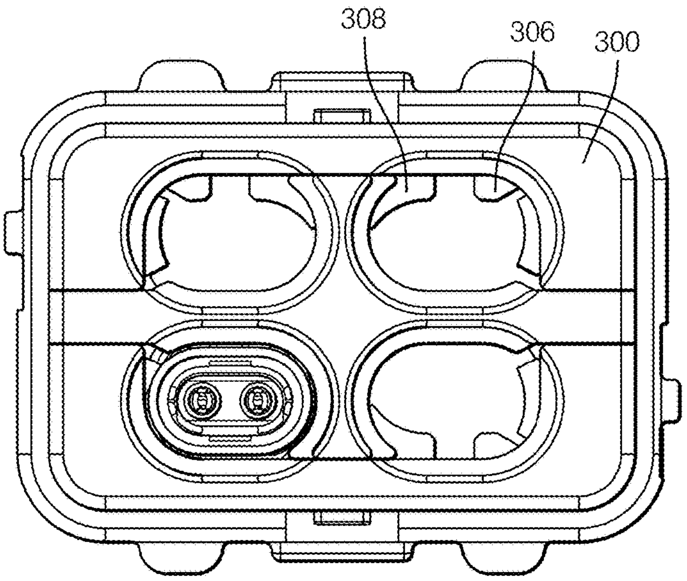
FIG. 18C illustrates a front view of the terminal module of FIG. 17 according to some embodiments.
Figure 19:
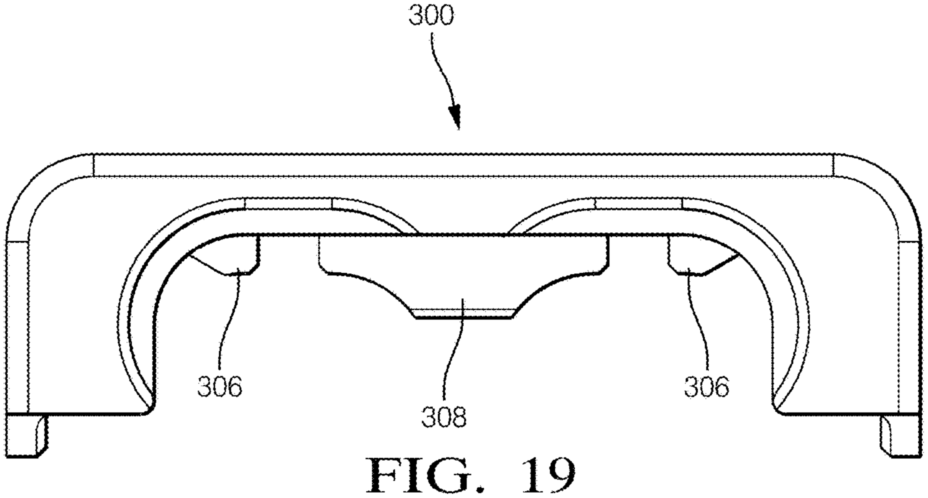
FIG. 19 illustrates a front view of the secondary terminal lock of the terminal module of FIG. 17 according to some embodiments.
Figure 20:
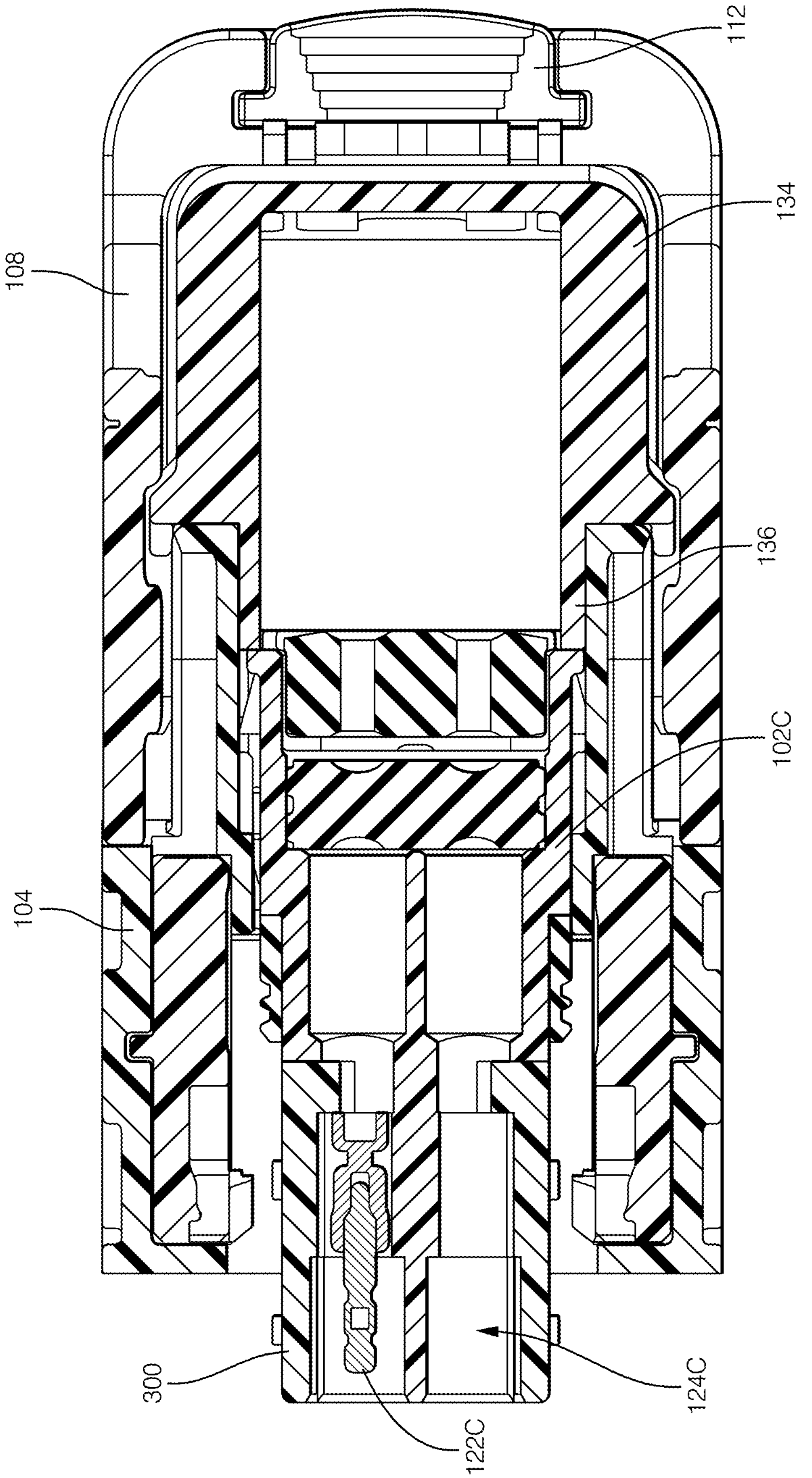
FIG. 20 illustrates a longitudinal cross section view of the terminal module of FIG. 17 according to some embodiments.

FIG. 16 shows the locking mechanism configured to secure the terminal modules 202 within the module bays 206 of the frame 204. Each terminal module 202 has plurality of cantilevered locking arms 214 that have latches 216 defined near the free ends of the locking arms 214. The latches are received in indentations 218 in the side walls of the module bays 206. The module bays 206 also define a plurality of stop pads 220 that are configured to contact the fixed end of the locking arms 214. The latches 216, indentations 218, and stop pads 220 cooperate to secure the terminal modules 202 within the module bays 206 and maintain the desired location of the terminal modules 202 in the terminal bays.

A first example of a secondary terminal locking mechanism 300 for the terminal modules 102C is shown in FIGS. 17 through 20. This second example is configured for use with an oval cylinder shaped twin axial terminal 122C. As the twin axial terminal 122C is inserted within the terminal cavity 124C in the terminal module 102C, it engages a flexible primary terminal locking mechanism 126C that extends from one of the side walls of the terminal cavity 124C. Once the twin axial terminals 122C are inserted into the terminal cavities 124C, the secondary terminal locking mechanism 300 is attached to the terminal module 102C by flexible arms 128C defined by the terminal module 102C that engage latching tabs 302 on sides of the secondary terminal locking mechanism 300.

The secondary terminal locking mechanism 300 defines a first tab 304 that extends from the secondary terminal locking mechanism 300 and engages the primary terminal locking mechanism 126C to inhibit flexing of the primary terminal locking mechanism 126C that may release the terminal 122C from the terminal cavity 124C. The secondary terminal locking mechanism 300 also defines curved second and third tabs 306, 308 that extend from the secondary terminal locking mechanism 300 and directly engage the rear end of the terminal 122C to inhibit removal of the terminal 122C from the terminal cavity 124C.

Figure 21:
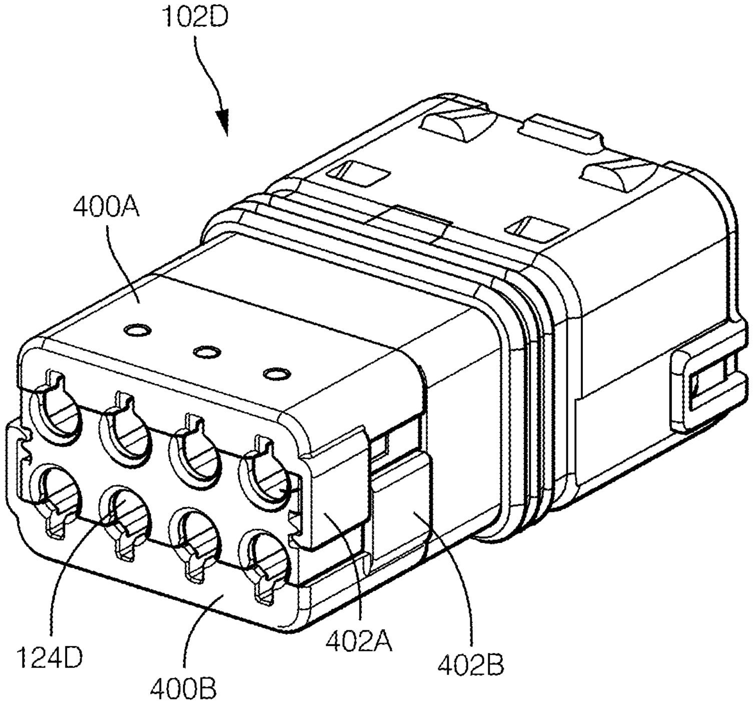
FIG. 21 illustrates a perspective view of a terminal module configured to contain coaxial cables and terminals assemblies according to some embodiments.
Figure 22A:
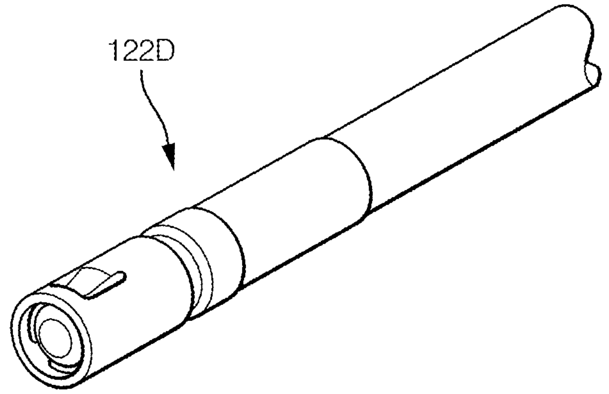
FIG. 22A illustrates a perspective view of a coaxial cable and terminal assembly according to some embodiments.
Figure 22B:
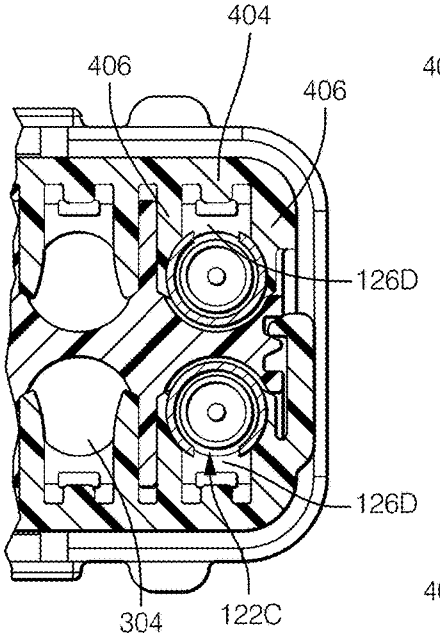
FIG. 22B illustrates a lateral cross section view of the terminal module of FIG. 21 according to some embodiments.
Figure 22C:
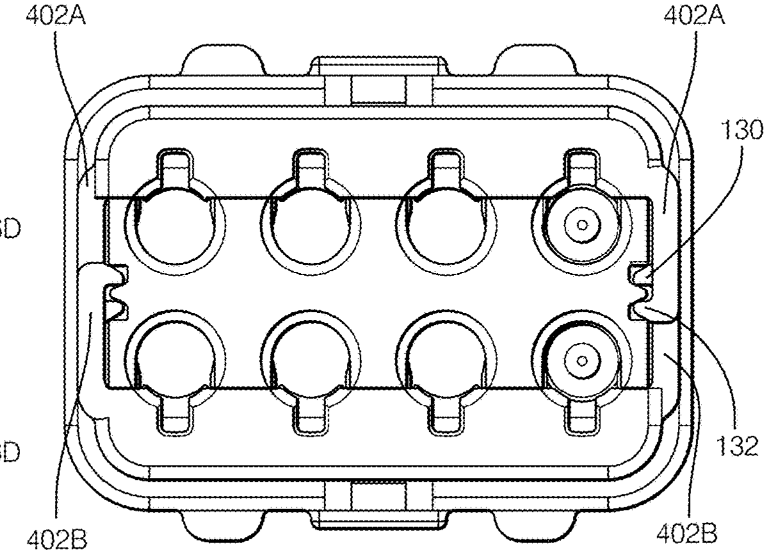
FIG. 22C illustrates a front view of the terminal module of FIG. 21 according to some embodiments.
Figure 23:
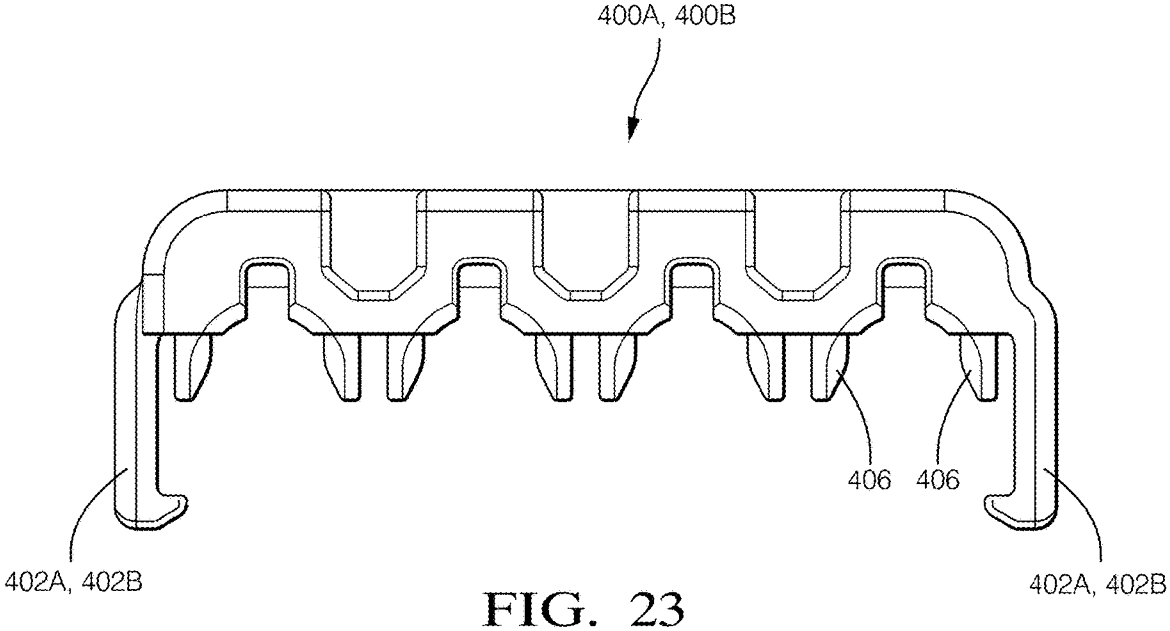
FIG. 23 illustrates a front view of the secondary terminal lock of the terminal module of FIG. 23 according to some embodiments.

A second example of a secondary terminal locking mechanism 400A, 400B for the terminal module 102D is shown in FIGS. 21 through 23. This first example is configured for use with a generally cylindrical coaxial terminal, for example coaxial terminal 122D shown in FIG. 18A. As the coaxial terminal 122D is inserted within the terminal cavity 124D in the terminal module 102D, it engages a flexible primary terminal locking mechanism 126D of the terminal module 102D that extends from the top or bottom wall of the terminal cavity 124D. Once the coaxial terminals 122D are inserted into the terminal cavities 124D, the secondary terminal locking mechanism 400A, 400B is moved from a pre-staged position in which the secondary terminal locking mechanism 400A, 400B allows flexing of the primary terminal locking mechanism 126D to a staged position in which the secondary terminal locking mechanism 400A, 400B inhibits flexing of the primary terminal locking mechanism 126D. The secondary terminal locking mechanism 400A is attached to the terminal module 102D by flexible arms 402A that engage one of two sets of grooves 130, 132 extending along the outer walls of the terminal module 102D. When the ends of the flexible arms 402A are engaged with the first grooves 130, the secondary terminal locking mechanism 400A is in the pre-staged position. When the ends of the flexible arms 402A are engaged with the second grooves 132, the secondary terminal locking mechanism 400A is in the staged position. The secondary terminal locking mechanism 400B is attached to the terminal module 102D by flexible arms 402B that engage the grooves 130, 132. When the ends of the flexible arms 402B are engaged with the second grooves 132, the secondary terminal locking mechanism 400B is in the pre-staged position. When the ends of the flexible arms 402B are engaged with the first grooves 130, the secondary terminal locking mechanism 400B is in the staged position. As shown in FIGS. 22B and 22C, both secondary terminal locking mechanism 400A and 400B are in the staged positions.

The secondary terminal locking mechanisms 400A, 400B define tabs 404 that extend from the secondary terminal locking mechanisms 400A, 400B and engages the primary terminal locking mechanism 126D when in the staged position to inhibit flexing of the primary terminal locking mechanism 126D that may release the coaxial terminal 122D from the terminal cavity 124D. The secondary terminal locking mechanisms 400A, 400B defines a pair of arms 406 that extend from the secondary terminal locking mechanisms 400A, 400B and directly engage the rear end of the coaxial terminal 122D to inhibit removal of the coaxial terminal 122D from the terminal cavity 124D.

While the examples of the secondary terminal locking mechanisms described above are configured for use with coaxial or twin axial terminals, other embodiments may be envisioned that are configured to be used with other terminal types.

Figure 25:
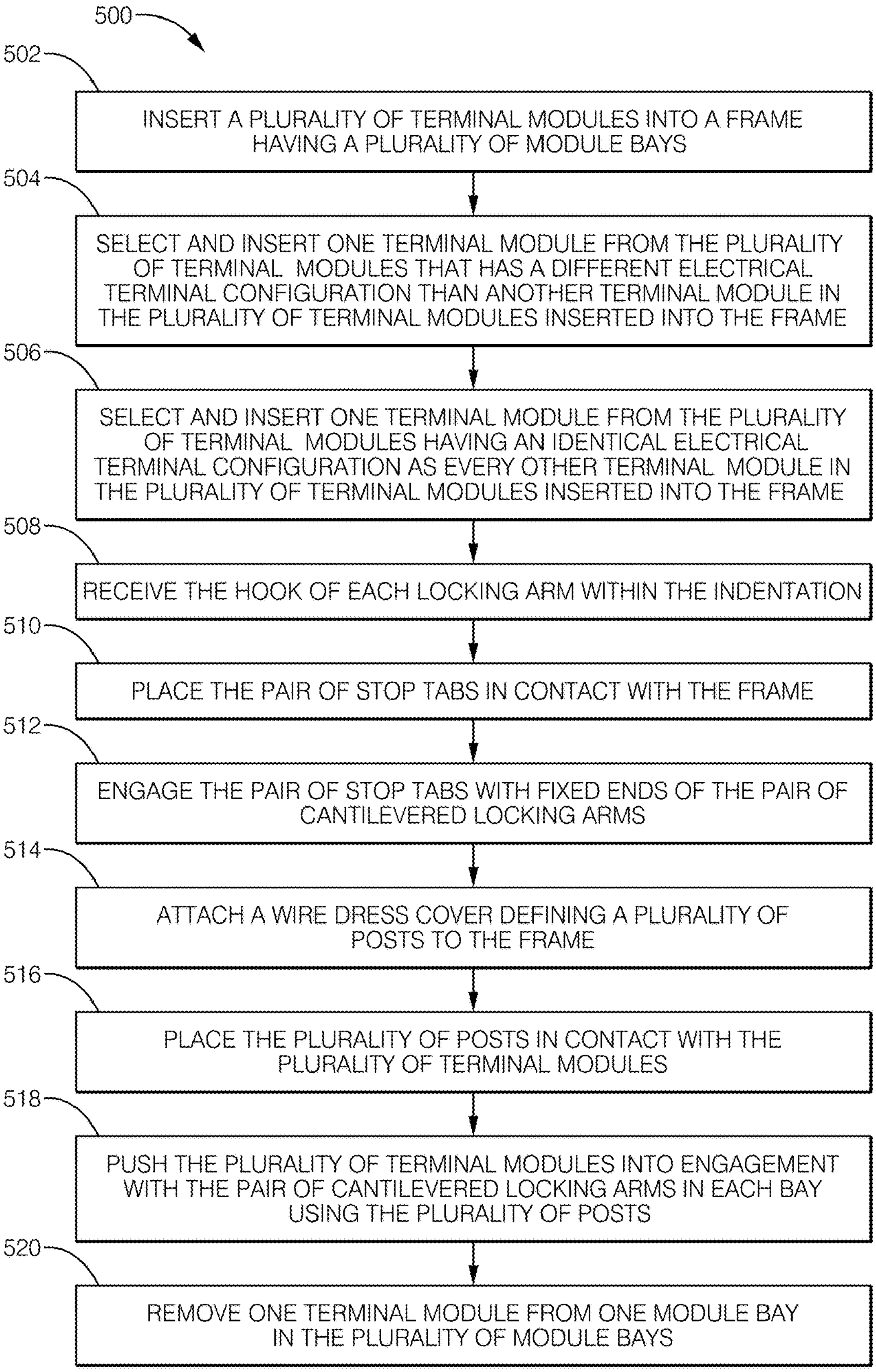
FIG. 25 illustrates a diagram of a method of assembling an electrical connector according to some embodiments.

FIG. 25 illustrates a method 500 of assembling an electrical connector, such as the electrical connector assemblies 100, 200 described above. The steps of the method are as follows:

STEP 502, INSERT A PLURALITY OF TERMINAL MODULES INTO A FRAME HAVING A PLURALITY OF MODULE BAYS, includes inserting a plurality of terminal modules 102 into a frame 104 having a plurality of module bays 106. Each of the terminal modules 102 has a housing and an electrical terminal 122 disposed within a cavity 124 in the housing. Each of the terminal modules 102 is configured to be received within any one of the plurality of module bays 106. Each module bay 106 may include a pair of cantilevered locking arms 114 arranged opposite one another. Each locking arm 114 may have a latch or hook 116 on a free end of each locking arm 114. A side of each terminal module 102 may define an indentation 118. Each terminal module 102 may define a pair of stop pads 120 projecting from the housing. Each module bay 106 may include four locking arms 114 and each housing may define four indentations 118 and four stop pads 120;

STEP 504, SELECT AND INSERT ONE TERMINAL MODULE FROM THE PLURALITY OF TERMINAL MODULES THAT HAS A DIFFERENT ELECTRICAL TERMINAL CONFIGURATION THAN ANOTHER TERMINAL MODULE IN THE PLURALITY OF TERMINAL MODULES INSERTED INTO THE FRAME, is an optional step that includes selecting and inserting one terminal module from the plurality of terminal modules that has a different electrical terminal configuration than another terminal module in the plurality of terminal modules inserted into the frame;

STEP 506 SELECT AND INSERT ONE TERMINAL MODULE FROM THE PLURALITY OF TERMINAL MODULES HAVING AN IDENTICAL ELECTRICAL TERMINAL CONFIGURATION AS EVERY OTHER TERMINAL MODULE IN THE PLURALITY OF TERMINAL MODULES INSERTED INTO THE FRAME, is an optional step that includes selecting and inserting one terminal module from the plurality of terminal modules having an identical electrical terminal configuration as every other terminal module in the plurality of terminal modules inserted into the frame;

STEP 508, RECEIVE THE HOOK OF EACH LOCKING ARM WITHIN THE INDENTATION, includes receiving the hook 116 of each locking arm 114 within the indentation 118, thereby securing each terminal module 102 in each module bay 106 of the frame 104;

STEP 510, PLACE THE PAIR OF STOP PADS IN CONTACT WITH THE FRAME, includes placing the pair of stop pads 120 in contact with the locking arm 114 of the frame 104, thereby aligning the hook 116 of each locking arm 114 with the indentation 118 in the side of the terminal module 102;

STEP 512, ENGAGE THE PAIR OF STOP PADS WITH FIXED ENDS OF THE PAIR OF CANTILEVERED LOCKING ARMS, includes engaging the pair of stop pads 120 with fixed ends of the pair of cantilevered locking arms 114;

STEP 514, ATTACHING A WIRE DRESS COVER DEFINING A PLURALITY OF POSTS TO THE FRAME, includes attaching a wire dress cover 134 defining a plurality of posts 136 to the frame 104;

STEP 516, PLACE THE PLURALITY OF POSTS IN CONTACT WITH THE PLURALITY OF TERMINAL MODULES, includes placing the plurality of posts 136 in contact with the plurality of terminal modules 102;

STEP 518, PUSH THE PLURALITY OF TERMINAL MODULES INTO ENGAGEMENT WITH THE PAIR OF CANTILEVERED LOCKING ARMS IN EACH MODULE BAY USING THE PLURALITY OF POSTS, includes pushing the plurality of terminal modules 102 into engagement with the pair of cantilevered locking arms 114 in each module bay 106 using the plurality of posts 136; and STEP 520, REMOVE ONE TERMINAL MODULE FROM ONE MODULE BAY IN THE PLURALITY OF MODULE BAYS, includes removing one terminal module 102 from one module bay 106.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector, comprising:

a terminal module having a housing defining a cavity configured to receive an electrical terminal within and a primary terminal lock configured to releasably retain the electrical terminal after it is fully inserted within the cavity; and a secondary terminal lock attached to the housing defining a protrusion that enters into the cavity at a location rearward of the electrical terminal as the secondary terminal lock is moved from a pre-stage position to a staged position;

a frame having a plurality of module bays, the terminal module being received within one of the plurality of module bays, the module bay including a pair of cantilevered locking arms arranged opposite one another, each locking arm having a hook on a free end of each locking arm, a side of each terminal module defining an indentation configured to receive the hook of each locking arm within the indentation; and a wire dress cover attached to the frame, the wire dress cover having a post in contact with the terminal module.

2. The electrical connector according to claim 1, wherein the secondary terminal lock is moved from the pre-stage position to the staged position along an axis that is generally parallel to an insertion direction of the electrical terminal into the cavity.

3. The electrical connector according to claim 1, wherein the terminal module is configured to be received within any one of the plurality of module bays.

4. The electrical connector according to claim 1, wherein the terminal module is removably attached to the frame.

5. The electrical connector according to claim 1, wherein the module bay includes a pair of cantilevered locking arms arranged opposite one another, wherein a free end of each locking arm defines a hook received with an indentation defined on a side of the housing, thereby securing each terminal module in the module bay.

6. The electrical connector according to claim 5, wherein the terminal module defines a pair of stop pads projecting from the housing configured to align the hook of each locking arm with the indentation in the side of the housing.

7. The electrical connector according to claim 6, wherein the pair of stop pads engage fixed ends of the pair of cantilevered locking arms.

8. The electrical connector according to claim 6, wherein the module bay includes four locking arms, and the housing defines four indentations and four stop pads.

9. The electrical connector according to claim 1, having a plurality of the terminal modules wherein each terminal module is configured to be received within any one of the plurality of module bays and wherein the wire dress cover has a plurality of posts in contact with the plurality of terminal modules.

10. The electrical connector according to claim 9, wherein the plurality of terminal modules is removably attached to the frame within the plurality of module bays.

11. A method of assembling an electrical connector, comprising:

inserting a plurality of terminal modules into a frame having a plurality of module bays, each terminal module having a housing and an electrical terminal disposed within a cavity in the housing, each terminal module is being configured to be received within any one of the plurality of module bays, each module bay including a pair of cantilevered locking arms arranged opposite one another, each locking arm having a hook on a free end of each locking arm, a side of each terminal module defining an indentation;

receiving the hook of each locking arm within the indentation, thereby securing each terminal module in each module bay of the frame;

attaching a wire dress cover defining a plurality of posts to the frame; and placing the plurality of posts in contact with the plurality of terminal modules.

12. The method according to claim 11, further comprising selecting and inserting one terminal module from the plurality of terminal modules that has a different electrical terminal configuration than another terminal module in the plurality of terminal modules inserted into the frame.

13. The method according to claim 11, further comprising selecting and inserting one terminal module from the plurality of terminal modules having an identical electrical terminal configuration as every other terminal module in the plurality of terminal modules inserted into the frame.

14. The method according to claim 11, wherein each terminal module defines a pair of stop pads projecting from the housing and wherein the method further comprises placing the pair of stop pads in contact with the frame, thereby aligning the hook of each locking arm with the indentation in the side of the housing.

15. The method according to claim 14, wherein the method further comprises engaging the pair of stop pads with fixed ends of the pair of cantilevered locking arms.

16. The method according to claim 14, wherein each module bay includes four locking arms, and each housing defines four indentations and four stop pads.

17. The method according to claim 11, further comprising pushing the plurality of terminal modules into engagement with the pair of cantilevered locking arms in each module bay using the plurality of posts.

18. The method according to claim 11, further comprising removing one terminal module in the plurality of terminal modules from one module bay in the plurality of module bays.

* * * * *